United States Patent
Zhang et al.

(10) Patent No.: US 12,026,928 B2
(45) Date of Patent: Jul. 2, 2024

(54) METHOD AND APPARATUS FOR DETECTING REGION OF INTEREST, ELECTRONIC DEVICE, AND READABLE STORAGE MEDIUM

(71) Applicant: TENCENT TECHNOLOGY (SHENZHEN) COMPANY LIMITED, Guangdong (CN)

(72) Inventors: Qing Zhang, Shenzhen (CN); Yu Shan Zheng, Shenzhen (CN); Shi Tao Wang, Shenzhen (CN); Shan Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 411 days.

(21) Appl. No.: 17/496,365

(22) Filed: Oct. 7, 2021

(65) Prior Publication Data
US 2022/0027655 A1    Jan. 27, 2022

Related U.S. Application Data

(63) Continuation of application No. PCT/CN2020/119895, filed on Oct. 9, 2020.

(30) Foreign Application Priority Data

Oct. 14, 2019   (CN) .......................... 201910974179.3

(51) Int. Cl.
G06V 10/25   (2022.01)
G06T 7/246   (2017.01)
(Continued)

(52) U.S. Cl.
CPC .............. *G06V 10/25* (2022.01); *G06T 7/248* (2017.01); *G06T 7/70* (2017.01); *G06V 10/26* (2022.01); *G06V 10/56* (2022.01); *G06V 20/40* (2022.01)

(58) Field of Classification Search
CPC ........ G06V 10/25; G06V 10/26; G06V 10/56; G06V 20/40; G06V 10/50; G06V 10/751; G06V 10/255; G06T 7/248; G06T 7/70
See application file for complete search history.

(56) References Cited

U.S. PATENT DOCUMENTS 6,496,228 B1 * 12/2002 McGee ................ H04N 19/503
                                                          348/700
10,083,502 B2 * 9/2018 Ryu ..................... A61B 8/0825
2019/0311477 A1   10/2019 Ryt et al.

FOREIGN PATENT DOCUMENTS

CN    101184430 A    5/2008
CN    101882316 A   11/2010
(Continued)

OTHER PUBLICATIONS

Chinese First Office Action for CN201910974179.3 dated Jun. 17, 2021.
(Continued)

*Primary Examiner* — Siamak Harandi
(74) *Attorney, Agent, or Firm* — Sughrue Mion, PLLC

(57) ABSTRACT

A method and an apparatus for detecting a region of interest (ROI), an electronic device, and a readable storage medium are provided. In the method for detecting a ROI, a target video frame image is divided into a plurality of image blocks and chrominance components of pixels of each image block are acquired. A ROI of the target video frame image is detected by determining a region type of each image block (Continued)

according to a ratio of pixels in an image block meeting a preset chrominance condition to pixels of the image block.

16 Claims, 7 Drawing Sheets

(51) Int. Cl.
*G06T 7/70* (2017.01)
*G06V 10/26* (2022.01)
*G06V 10/56* (2022.01)
*G06V 20/40* (2022.01)

(56) References Cited

FOREIGN PATENT DOCUMENTS

| | | |
|---|---|---|
| CN | 104205815 A | 12/2014 |
| CN | 106295587 A | 1/2017 |
| CN | 106791856 A | 5/2017 |
| CN | 110689014 A | 1/2020 |

OTHER PUBLICATIONS

International Search Report for PCT/CN2020/119895 dated Jan. 13, 2021 [PCT/ISA/210].
Written Opinion for PCT/CN2020/119895 dated Jan. 13, 2021 [PCT/ISA/237].

* cited by examiner

METHOD AND APPARATUS FOR DETECTING REGION OF INTEREST, ELECTRONIC DEVICE, AND READABLE STORAGE MEDIUM

CROSS-REFERENCE TO RELATED APPLICATION(S)

This application is a continuation application of International Application No. PCT/CN2020/119895, filed Oct. 9, 2020, which claims priority to Chinese Patent Application No. 201910974179.3, filed on Oct. 14, 2019 with the China National Intellectual Property Administration, the disclosures of which are incorporated by reference in their entireties.

FIELD

The disclosure relates to the field of image processing technologies, and specifically, to a method and an apparatus for detecting a region of interest (ROI), an electronic device, and a readable storage medium.

BACKGROUND

A region of interest (ROI) refers to, in machine vision and image processing, a region that needs to be processed and that is outlined in a box, a circle, an ellipse, an irregular polygon, or the like from a processed image. When an image is processed, a ROI in the image is first detected, to reduce a time of processing the image while increasing precision of processing the image.

A current approach of detecting a ROI is training a neural network by using a large number of images with ROIs as training samples, and detecting a ROI in an image by using the trained neural network. Such an approach has low detection efficiency, and is time-consuming, resulting in difficulty in meeting real-time detection requirements.

SUMMARY

An objective of the disclosure is to resolve at least one of the foregoing technical defects. Therefore, the following technical solutions are provided;

According to an aspect of the disclosure, a method for detecting a region of interest (ROI) is provided, performed by an electronic device, the method including:

dividing a target video frame image into a plurality of image blocks, each of the plurality of image blocks having a preset size;

acquiring, for each image block, chrominance components of pixels of an image block, and determining a pixel ratio of the image block according to the chrominance components of the pixels, the pixel ratio being a ratio of pixels meeting a preset chrominance condition to the pixels of the image block;

determining region types of the plurality of image blocks based on pixel ratios of the plurality of image blocks; and detecting a ROI of the target video frame image according to the region types of the plurality of image blocks.

According to another aspect of the disclosure, an apparatus for detecting a ROI is provided, including:

at least one memory configured to store program code; and at least one processor configured to read the program code and operate as instructed by the program code, the program code comprising:

division code configured to cause the at least one processor to divide a target video frame image into a plurality of image blocks, each of the plurality of image blocks having a preset size;

component acquiring code configured to cause the at least one processor to acquire, for each image block, chrominance components of pixels of an image block, and determine a pixel ratio of the image block according to the chrominance components of the pixels, the pixel ratio being a ratio of pixels meeting a preset chrominance condition to the pixels of the image block;

type determining code configured to cause the at least one processor to determine region types of the plurality of image blocks based on pixel ratios of the plurality of image blocks; and detection code configured to cause the at least one processor to detect a ROI of the target video frame image according to the region types of the plurality of image blocks.

According to another aspect of the disclosure, an electronic device is provided, including a memory, a processor, and a computer program stored on the memory and executable by the processor to perform the foregoing method for detecting the ROI.

According to another aspect of the disclosure, a non-transitory computer-readable storage medium is provided, the non-transitory computer-readable storage medium storing a computer program, executable by a processor, to perform the foregoing method for detecting a ROI.

According to another aspect of the disclosure, an embodiment of the disclosure further provides a computer program product or a computer program, including computer instructions, the computer instructions being stored on a computer-readable storage medium. A processor of a computer device reads the computer instructions from the computer-readable storage medium, and executes the computer instructions, to cause the computer device to perform the foregoing method for detecting a ROI.

BRIEF DESCRIPTION OF THE DRAWINGS

The foregoing and/or additional aspects and advantages of the disclosure will become apparent and comprehensible in the description of example embodiments made with reference to the following accompanying drawings.

DETAILED DESCRIPTION

Figure 1:
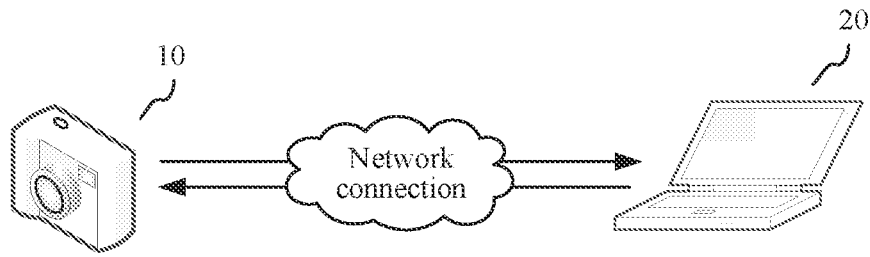
FIG. 1 is a diagram of an application environment of a method for detecting a region of interest (ROI) according to an embodiment of the disclosure.

Embodiments of the disclosure are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are only examples, and are only used to describe the inventive concept of the disclosure and cannot be construed as a limitation to the disclosure.

A person skilled in the art would understand that, the singular forms "a", "an", and "the" used herein may include the plural forms as well, unless the context clearly indicates otherwise. It is to be further understood that, the terms "include" and/or "comprise" used in this specification of the disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of the disclosure clearer, the following further describes implementations of the disclosure in detail with reference to the accompanying drawings.

A method and an apparatus for detecting a region of interest (ROI), an electronic device and a computer-readable storage medium provided in the disclosure are to resolve the foregoing technical problems.

The following describes the technical solutions of the disclosure and how to resolve the foregoing technical problems according to the technical solutions of the disclosure in detail with reference to example embodiments. The following several example embodiments may be combined with each other, and the same or similar concepts or processes may not be described repeatedly in some embodiments. The following describes the embodiments of the disclosure with reference to the accompanying drawings.

A method for detecting a ROI provided in the disclosure is applicable to an application environment shown in FIG. 1. Specifically, a camera device 10 captures a target image or a target video. Hereinafter, a target video captured by the camera device 10 is described as an example. The camera device 10 transmits the target video to a terminal 20. The terminal 20 acquires a target video frame image from the target video, and divides the target video frame image into a plurality of image blocks with a preset size. The terminal 20 acquires, for each image block, chrominance components of pixels of the image block, and determines a qualifying-pixel ratio of the image block according to the chrominance components of the pixels. The terminal 20 determines region types of the image blocks based on qualifying-pixel ratios of the image blocks. The terminal 20 generates a ROI map according to the region types of the image blocks, and detects a ROI of the target video frame image based on the ROI map.

The method for detecting a ROI in the foregoing application scenario may be performed on a terminal, and in other application scenarios, the foregoing method for detecting a ROI may alternatively be applied to a server. In other application scenarios, the terminal 20 may alternatively capture a target video, then extract a target video frame image from the target video, and detect a ROI of the target video frame image.

A person skilled in the art would understand that, the "terminal" used herein may be a mobile phone, a tablet computer, a personal digital assistant (PDA), a mobile Internet device (MID), or the like; and the "server" may be implemented by using an independent server or a server cluster including a plurality of servers.

Figure 2:
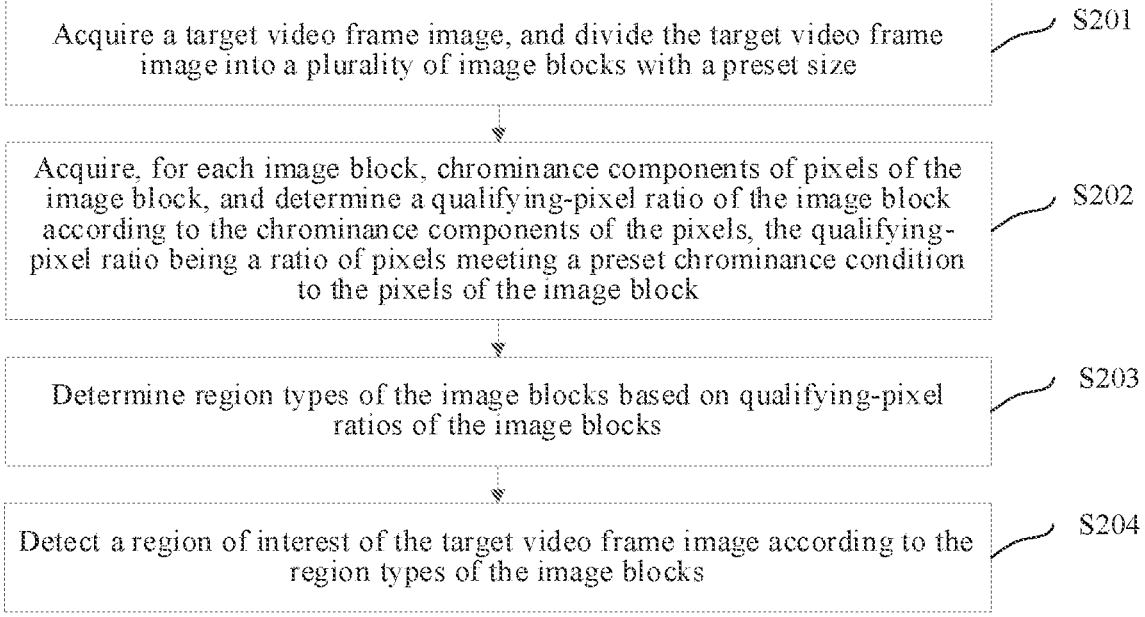
FIG. 2 is a schematic flowchart of a method for detecting a ROI according to an embodiment of the disclosure.

In an embodiment of the disclosure, as shown in FIG. 2, a method for detecting a ROI is provided. The method is performed by an electronic device such as the terminal 20 in FIG. 1 or a server, and may include the following operations:

Operation S201: Acquire a target video frame image, and divide the target video frame image into a plurality of image blocks with a preset size.

Specifically, an image block includes a brightness pixel block and two additional chrominance pixel blocks. In this embodiment of the disclosure, "a plurality of" refers to two or more.

In an example embodiment, a target video is acquired, a target video frame image is extracted from the target video, a target video frame image in a preset sampling format may be acquired, and the target video frame image is divided into a plurality of image blocks according to a preset size corresponding to the preset sampling format.

In another example embodiment, a target video frame image may alternatively be acquired, a sampling format of the target video frame image is determined, a preset size corresponding to the preset sampling format is acquired, and the target video frame image is divided into a plurality of image blocks according to the preset size.

For example, a brightness block in an image block is a pixel block with a size of 16×16, and for a target video frame image of which a sampling format is YUV420, chrominance blocks are pixel blocks with a size of 8×8.

Operation S202: Acquire, for each image block, chrominance components of pixels of the image block, and determine a qualifying-pixel ratio of the image block according to the chrominance components of the pixels, the qualifying-pixel ratio being a ratio of pixels meeting a preset chrominance condition to the pixels of the image block.

Specifically, the chrominance component may include a U component and a V component, and a preset chrominance condition may be a chrominance condition for the U component and the V component.

In an example embodiment, a total quantity of pixels of each image block may be determined, a U component and a V component of each pixel are acquired, and whether the each pixel meets a preset chrominance condition is determined according to the U component and the V component of the each pixel, thereby determining a ratio of pixels meeting the preset chrominance condition to the pixels of the each image block.

Specifically, the preset chrominance condition may be set to a condition that the U component is not less than 100 and not greater than 127, and the V component is not less than 135 and not greater than 155. Further, the ratio of the pixels meeting the foregoing preset chrominance condition to the pixels of the each image block is counted, to obtain a qualifying-pixel ratio of the image block. It is to be understood that, the foregoing selection range of the U component and the V component corresponds to an effect produced by selecting a plurality of image sequences for testing. When the preset chrominance condition falls within the selection range, a ROI of an image may be detected properly even for people of different skin colors captured in the image, leading to higher universality. When the selection range is excessively broad, some irrelevant points around the image may be detected, and when the selection range is excessively narrow, the ROI may not be completely detected.

Operation S203: Determine region types of image blocks based on qualifying-pixel ratios of the image blocks.

Specifically, the region type includes a ROI type and a non-ROI type.

In an example embodiment, a first preset ratio and a second preset ratio may be set, and the first preset ratio is greater than the second preset ratio. The qualifying-pixel ratio is compared with the first preset ratio and the second preset ratio, respectively. When the qualifying-pixel ratio of the image block is not greater than the second preset ratio, the region type of the image block may be set as the non-ROI type. When the qualifying-pixel ratio of the image block is not less than the first preset ratio, the region type of the image block may be set as the ROI type. A detailed process of determining the region types of the image blocks is further described below.

Operation S204: Detect a ROI of the target video frame image according to the region types of the image blocks.

In this operation, image blocks belonging to the ROI type are determined according to the region types of the image blocks; and a region in which the image blocks belonging to the ROI type is located is determined as the ROI of the target video frame image.

In another embodiment of the disclosure, a ROI map may be generated according to the region types of the image blocks, then the ROI of the target video frame image is detected based on the ROI map. The ROI map is a map obtained by marking the region types of the image blocks of the target video frame image.

In an example embodiment, image blocks belonging to the ROI type in the ROI map are detected, and the ROI of the target video frame image may be obtained according to the detected image blocks belonging to the ROI type.

In the method for detecting a ROI provided by this embodiment, a target video frame image is divided into a plurality of image blocks; then, chrominance components of pixels of each image block are acquired, and a qualifying-pixel ratio of the image block is determined according to the chrominance components of the pixels; then region types of the image blocks are determined based on qualifying-pixel ratios of the image blocks; and further, a ROI map is generated according to the region types of the image blocks. The method for detecting a ROI in an example embodiment, has high detection efficiency and is less time-consuming, and therefore, may meet provide real-time ROI detection capability.

Figure 3:
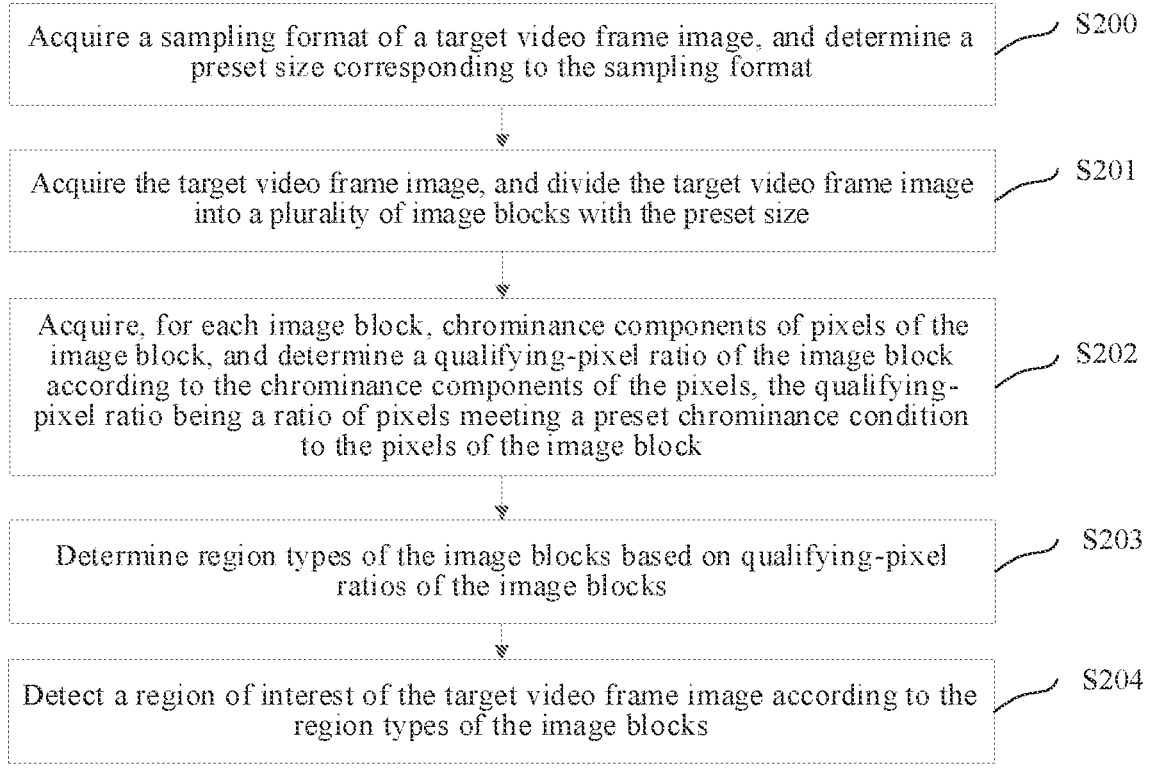
FIG. 3 is a schematic flowchart of a method for detecting a ROI according to an embodiment of the disclosure.

In an example embodiment of the disclosure, a method for detecting a ROI shown in FIG. 3 is performed by an electronic device such as the terminal 20 in FIG. 1 or a server. Before the dividing the target video frame image into a plurality of image blocks with a preset size in operation S201, the method may further include:

Operation S200: Acquire a sampling format of the target video frame image, and determine the preset size corresponding to the sampling format.

Specifically, the server may pre-store various sampling formats and a preset size corresponding to each sampling format. After the sampling format of the target video frame image is determined, a preset size corresponding to the preset sampling format is queried for, and then the target video frame image is divided into the plurality of image blocks according to the preset size.

For example, a brightness block in an image block is a pixel block with a size of 16×16, and for a target video frame image of which a sampling format is YUV420, chrominance blocks are pixel blocks with a size of 8×8.

A process of determining the region types of the image blocks is further described below in detail with reference to the accompanying drawings and the embodiments.

In an example embodiment of the disclosure, the determining region types of the image blocks based on qualifying-pixel ratios of the image blocks in operation S203 may include:

setting, for each image block in the image blocks, a region type of the image block to a ROI type when a qualifying-pixel ratio of the image block is not less than a first preset ratio.

Specifically, the server may set the first preset ratio, and when a ratio of pixels meeting the preset chrominance condition to all pixels in the image block is not less than the first preset ratio, the region type of the image block is set as the ROI type.

For example, the first preset ratio may be set to 75%, and when the ratio of the pixels meeting the preset chrominance condition to all the pixels in the image block is not less than 75%, the region type of the image block is set as the ROI type.

In an example embodiment of the disclosure, the determining region types of the image blocks based on qualifying-pixel ratios of the image blocks in operation S203 may include:

setting, for each image block in the image blocks, a region type of the image block to a non-ROI type when a qualifying-pixel ratio of the image block is not greater than a second preset ratio.

Specifically, the server may set the second preset ratio, the second preset ratio is less than the first preset ratio, and when a ratio of pixels meeting the preset chrominance condition to all pixels in the image block is not greater than the second preset ratio, the region type of the image block is set as the non-ROI type.

For example, the second preset ratio may be set to 12.5%, and when the ratio of the pixels meeting the preset chrominance condition to all the pixels in the image block is not greater than 12.5%, the region type of the image block is set as the non-ROI type.

In the foregoing embodiments, when the qualifying-pixel ratio of the image block is not greater than the second preset ratio or not less than the first preset ratio, the region type of the image block may be directly determined, and when the qualifying-pixel ratio of the image block is greater than the second preset ratio and less than the first preset ratio, the region type of the image block needs to be determined with reference to region types of other image blocks around the image block.

A process of determining the region type of the image block according to region types of spatially neighboring blocks around the image block is further described below with reference to the embodiments.

In an example embodiment of the disclosure, the determining region types of the image blocks based on qualifying-pixel ratios of the image blocks in operation S203 may include the following operations (1)-(2):

(1) Acquire, for each image block in the image blocks, a region type of at least one spatially neighboring block of the image block when a qualifying-pixel ratio of the image block is greater than a second preset ratio and less than a first preset ratio.

Region types of spatially neighboring blocks have been pre-determined, and the spatially neighboring blocks are adjacent to the image block respectively.

Specifically, determining the region types of the spatially neighboring blocks may include: determining sequentially the region types of the image blocks according to a preset sequence.

In an example embodiment, the at least one spatially neighboring block is located at a preset spatially neighboring position, and the preset spatially neighboring position is set based on the preset sequence. The preset sequence may be a sequence from top to bottom and from left to right. For example, a region type of the leftmost image block in the first row is first determined, and region types of all image blocks in the first row are sequentially determined rightward; then, a region type of the leftmost image block in the second row is determined, and region types of all image blocks in the second row are sequentially determined rightward, so that region types of all image blocks are sequentially determined according to the foregoing preset sequence. The preset sequence may alternatively be a sequence from bottom to top and from right to left, or from bottom to top and from left to right, or from top to bottom and from right to left, and a specific preset sequence is not limited herein. However, region types of image blocks in each column or row need to be sequentially determined, and every time image blocks in a column or row are determined, region types of image blocks in a next column or row need to be sequentially determined.

Figure 4:
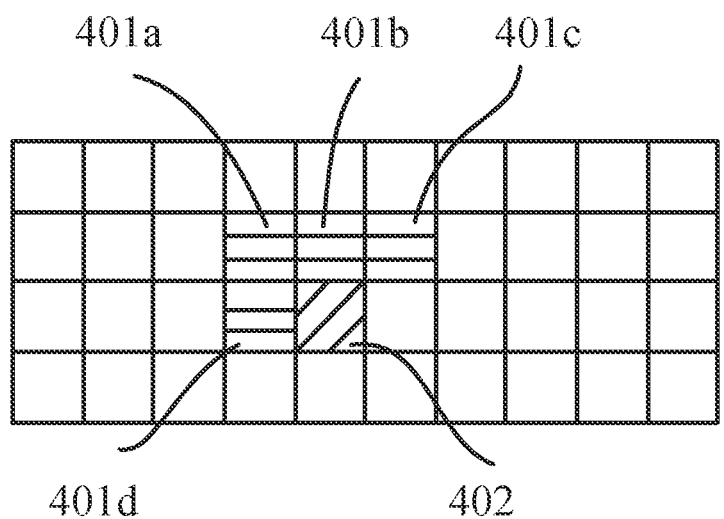
FIG. 4 is a schematic diagram of an example of positions of spatially neighboring blocks according to an embodiment of the disclosure.

As shown in FIG. 4, when the preset sequence is the sequence from top to bottom and from left to right, the region type of the leftmost image block in the first row is first determined, and the region types of all the image blocks in the first row are sequentially determined rightward; then, the region type of the leftmost image block in the second row is determined, and the region types of all image blocks in the second row are sequentially determined rightward, so that the region types of all the image blocks are sequentially determined according to the foregoing preset sequence. In FIG. 4, an image block 402 is an image block of which a region type is to be determined currently, and an image block 401a, an image block 401b, an image block 401c, and an image block 401d are spatially neighboring blocks of the image block 402.

In another example embodiment, when the preset sequence is another sequence, positions of the spatially neighboring blocks change correspondingly, but the spatially neighboring blocks are adjacent to the image block of which a region type is to be determined, and region types of the spatially neighboring blocks have been determined.

(2) Determine, according to the region type of the at least one spatially neighboring block, a quantity of spatially neighboring blocks belonging to a ROI type, and set the region type of the image block as the ROI type when the quantity of the spatially neighboring blocks belonging to the ROI type is not less than a preset first threshold.

Specifically, the quantity of the spatially neighboring blocks belonging to the ROI type is compared with the preset first threshold, and when the quantity of the spatially neighboring blocks belonging to the ROI type is not less than the preset first threshold, the region type of the image block is set as the ROI type.

Using a description shown in FIG. 4 as an example, when the first threshold is set to 1, that is to say, when at least one of the image block 401a, the image block 401b, the image block 401c, and the image block 401d belongs to the ROI type, it is determined that the image block 402 belongs to the ROI type.

In the foregoing embodiments, when the qualifying-pixel ratio of the image block is greater than the second preset ratio and less than the first preset ratio, the region type of the image block may be determined according to the region types of the spatially neighboring blocks, so that the accuracy of determining a region type of an image block is further improved.

In another example embodiment, when the qualifying-pixel ratio of the image block is greater than the second preset ratio and less than the first preset ratio, the region type of the image block may additionally or alternatively be determined according to region types of temporally neighboring blocks, which is described below in detail with reference to the embodiments.

In an example embodiment of the disclosure, the determining region types of the image blocks based on qualifying-pixel ratios of the image blocks in operation S203 may include the following operations (1)-(3):

(1) Query, for each image block in the image blocks, one or more previous frame images of the target video frame image when a qualifying-pixel ratio of the image block is greater than a second preset ratio and less than a first preset ratio.

Specifically, when the target video frame image does not have one or more previous frame images, and the quantity of the spatially neighboring blocks belonging to the ROI type is less than the preset first threshold, the region type of the image block is set as the non-ROI type.

(2) Acquire, from the one or more previous frame images, a temporally corresponding block corresponding to the image block, and acquire a plurality of temporally neighboring blocks adjacent to the temporally corresponding block.

Specifically, the temporally corresponding block may be a reference block of the image block, and the reference block may be an image block having the same coordinates as the image block in the one or more previous frame images, or an image block obtained after an image block having the same coordinates as the image block in the one or more previous frame images moves. An example approach of acquiring the temporally corresponding block is described below in detail.

In an example embodiment, the temporally neighboring blocks are image blocks surrounding the temporally corresponding block and adjacent to a side or a vertex of the temporally corresponding block.

In an embodiment, the operation of acquiring, from the one or more previous frame images, a temporally corresponding block corresponding to the image block may include the following operations:
- a1: Determine, for each image block in the image blocks, a coordinate position of the image block in the target video frame image.
- b1: Set an image block having the coordinate position in the one or more previous frame images as the temporally corresponding block.

In another example embodiment, the operation of acquiring, from the one or more previous frame images, a temporally corresponding block corresponding to the image block may include the following operations:
- a2: Determine, for each image block in the image blocks, a coordinate position of the image block in the target video frame image.
- b2: Acquire motion information between the one or more previous frame images and the target video frame image, adjust the coordinate position according to the motion information, and acquire, from the one or more previous frame images, the temporally corresponding block according to the adjusted coordinate position.

Figure 5:
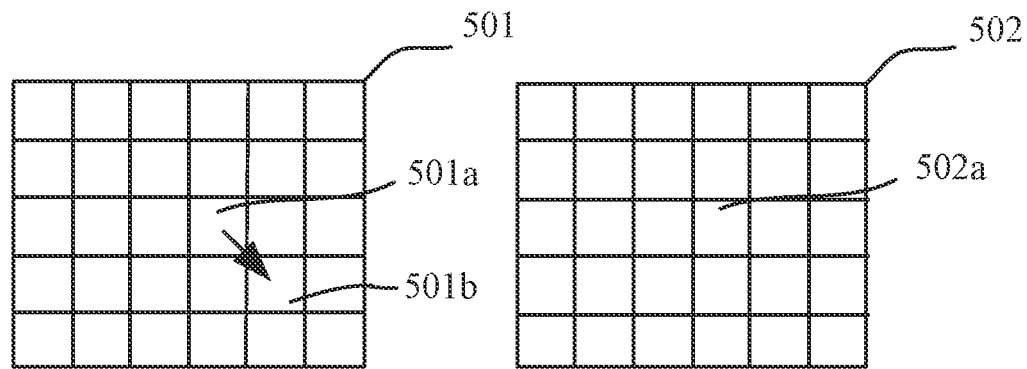
FIG. 5 is a schematic diagram of an example of positions of temporally corresponding blocks according to an embodiment of the disclosure.

As shown in FIG. 5, acquiring a temporally corresponding block from a previous frame image 501 is described as an example. FIG. 5 includes the previous frame image 501 and a target video frame image 502, and an image block 502a in the target video frame image 502 is an image block of which a region type is to be determined currently, and coordinates of the image block 502a may be acquired. Then, motion information between the previous frame image 501 and the target video frame image 502 is acquired, the coordinates of the image block 502a are adjusted, and a temporally corresponding block 501b is acquired from the previous frame image 501 according to the adjusted coordinates.

Specifically, the motion information includes a speed, a displacement variation, and direction information between the one or more previous frame images and the target video frame image. For example, the motion information may include an optical flow, that is, an instantaneous speed of pixel motion; or may include a motion vector and the like. The coordinates of the image block 502a are adjusted according to the motion information, that is to say, a coordinate position of the image block 502a is reversely calculated according to the direction in the motion information, and displacement information is subtracted from the motion information, to obtain a coordinate position of the temporally corresponding block 501b.

Alternatively, the coordinates of the image block 502a may be acquired, and one or more image blocks 501a having the same coordinates as the image block 502a is or are determined from the one or more previous frame images 501; and then coordinates of the one or more image blocks 501a are adjusted according to the motion information between the one or more previous frame images 501 and the target video frame image 502, so that the temporally corresponding block 501b is obtained.

(3) Determine, according to the region types of the temporally corresponding block and the temporally neighboring blocks, a quantity of the temporally corresponding block and the temporally neighboring blocks belonging to the ROI type, and set the region type of the image block as the ROI type when a sum of the temporally corresponding block and the temporally neighboring blocks belonging to the ROI type is not less than a preset second threshold.

Specifically, the region types of the temporally corresponding blocks are acquired, and the region types of the plurality of temporally neighboring blocks are respectively acquired. When a quantity of blocks belonging to the ROI type in the temporally corresponding block and the temporally neighboring blocks is not less than the preset second threshold, the region type of the image block is set as the ROI type.

For example, the second threshold is set to 2, and when there are at least two blocks belonging to the ROI type in the temporally corresponding block and the plurality of temporally neighboring blocks, the region type of the image block is set as the ROT type.

In the foregoing embodiments, when the qualifying-pixel ratio of the image block is greater than the second preset ratio and less than the first preset ratio, the region type of the image block may be determined according to the region types of the temporally corresponding blocks and the temporally neighboring blocks, so that the accuracy of determining a region type of an image block is further improved.

In an example embodiment of the disclosure, the detecting a ROI of the target video frame image according to the region types of the image blocks in operation S204 may include:
- marking image blocks belonging to the ROI type in the image blocks of the target video frame image, to obtain a ROI map, and
- detecting the ROI of the target video frame image according to the ROI map.

Specifically, the image blocks of the target video frame image may be marked by using different colors, different symbols, and other forms according to different region types, so that the ROI map is obtained.

Figure 6:
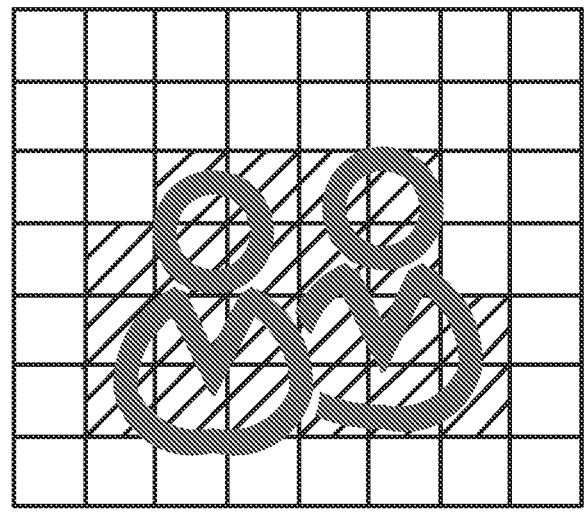
FIG. 6 is a schematic diagram of an example of a ROI map according to an embodiment of the disclosure.

Using a description shown in FIG. 6 as an example, image blocks belonging to the ROT type and the non-ROI type may be marked in the target video frame image by different shapes, for example, as shown in FIG. 6, image blocks filled with stripes represent image blocks belonging to the ROI type, and image blocks not filled with the stripes represent image blocks belonging to the non-ROI type, so that the ROI map of the target video frame image is obtained. A contiguous region constituted by the image blocks filled with the stripes is determined as the ROI of the target video frame image.

In an example embodiment of the disclosure, the detecting a ROT of the target video frame image according to the region types of the image blocks in operation S204 may include the following operations (1)-(3):

(1) Mark image blocks belonging to the ROI type in the image blocks of the target video frame image, to obtain an initial region map.

Figure 7A:
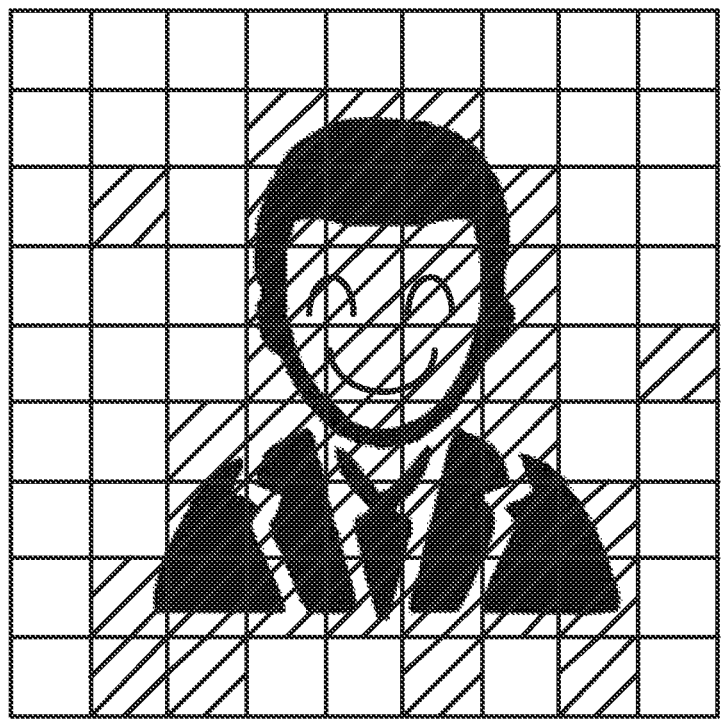
FIG. 7*a* is a schematic diagram of an example of an initial region map according to an embodiment of the disclosure.

FIG. 7a is a schematic diagram of an example of an initial region map according to an embodiment of the disclosure. As shown in FIG. 7a, there are some isolated image blocks belonging to the ROI type in the detected initial region map.

(2) Corrode the initial region map based on a preset corrosion template, to obtain a corrosion map.

In an example embodiment, the corrosion template may be a symmetrical square template, for example, a 3×3 symmetrical square template may be used; and may alternatively be another template such as an asymmetric template or a non-square template. The corrosion template may be used for eliminating the isolated image blocks of the ROI type in the initial region map, thereby improving the accuracy of ROI detection.

Figure 7B:
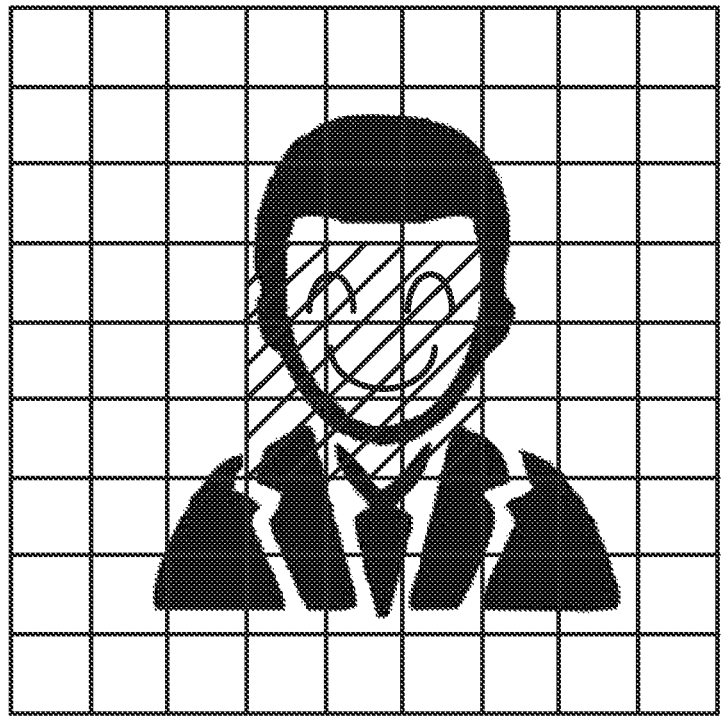
FIG. 7b is a schematic diagram of an example of a corrosion map according to an embodiment of the disclosure.

FIG. 7b is an example of a corrosion map obtained by corroding the initial region map in FIG. 7a, and the isolated image blocks of the ROT type in FIG. 7a are eliminated in FIG. 7b.

(3) Expand the corrosion map based on a preset expansion template, to obtain a ROT map; and detect the ROT of the target video frame image according to the ROI map.

Figure 7C:
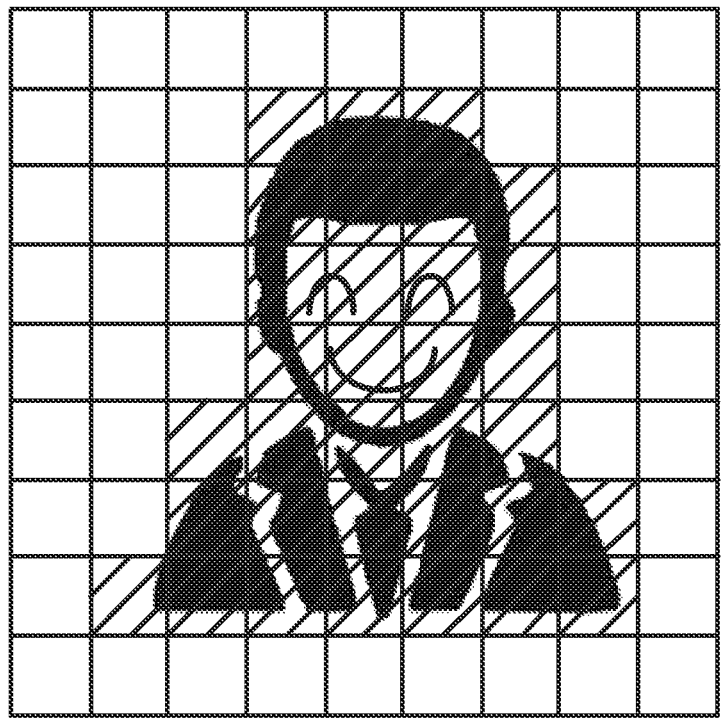
FIG. 7c is a schematic diagram of an example of a ROI map according to an embodiment of the disclosure.

FIG. 7c is an example of a ROT map obtained by expanding the corrosion map in FIG. 7b, so that error regions removed through corrosion may be supplemented. In this case, a contiguous ROI is obtained, and is determined as the ROI of the target video frame image.

In an example embodiment, the expansion template may be an asymmetric template, and a position of a central point in the asymmetric template is set based on the preset sequence according to which the region types of the image blocks are determined. The expansion template may supplement the error regions removed through corrosion, to improve the accuracy of ROI detection.

When the region types of the image blocks are sequentially determined according to the preset sequence, region types of image blocks at the back of the sequence may be determined according to the spatially neighboring blocks of which region types have been determined, and are relatively easy to determine. The asymmetric template may be used for restoring image blocks of which region types are not easy to determine, thereby further improving the accuracy of ROI detection.

Figure 8:
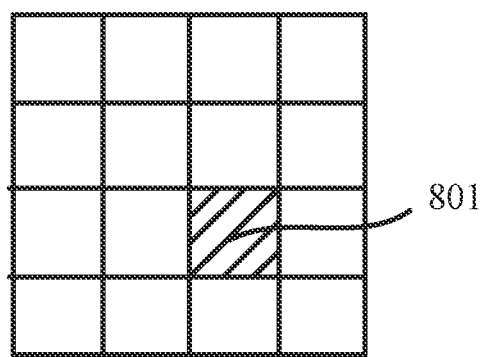
FIG. 8 is a schematic diagram of an example of an asymmetric template according to an embodiment of the disclosure.

FIG. 8 is a schematic diagram of an example of an asymmetric template according to an embodiment of the disclosure. As shown in FIG. 8, when the preset sequence is a sequence from top to bottom and from left to right, a region type of the leftmost image block in the first row is first determined, and region types of all image blocks in the first row are sequentially determined rightward; then, a region type of the leftmost image block in the second row is determined, and region types of all image blocks in the second row are sequentially determined rightward, so that region types of all image blocks are sequentially determined according to the foregoing preset sequence. In this case, region types of image blocks in an upper left region are relatively easy to determine, and region types of image blocks in a lower right region are relatively difficult to determine. In this case, the asymmetric template shown in FIG. 8 may be used for expansion, and a center point 801 is set in the lower right region, which may restore the image blocks of which region types are not easy to determine, thereby further improving the accuracy of ROI detection.

In the method for detecting a ROI, a target video frame image is divided into a plurality of image blocks; then, chrominance components of pixels of each image block are acquired, and a qualifying-pixel ratio of the image block is determined according to the chrominance components of the pixels; then, region types of the image blocks are determined based on qualifying-pixel ratios of the image blocks; and further, a ROI map is generated according to the region types of the image blocks. This method has high detection efficiency and is less time-consuming, and therefore, may provide real-time ROI detection capability.

In addition, when the qualifying-pixel ratio of the image block is greater than the second preset ratio and less than the first preset ratio, the region type of the image block may be determined according to the region types of the spatially neighboring blocks and/or the region types of the temporally neighboring blocks, so that the accuracy of determining a region type of an image block is further improved.

Further, the initial region map is corroded by using the preset corrosion template, and then, the corrosion map is expanded by using the preset expansion template, to eliminate the isolated image blocks of the ROI type in the initial region map, and supplement the error regions removed through the corrosion, to improve the accuracy of ROI detection.

Further, an asymmetric template is used, and a position of a central point in the asymmetric template is set based on the preset sequence according to which the region types of the image blocks are determined, so as to restore the image blocks of which the region types are not easy to determine, thereby further improving the accuracy of ROI detection.

Figure 9:
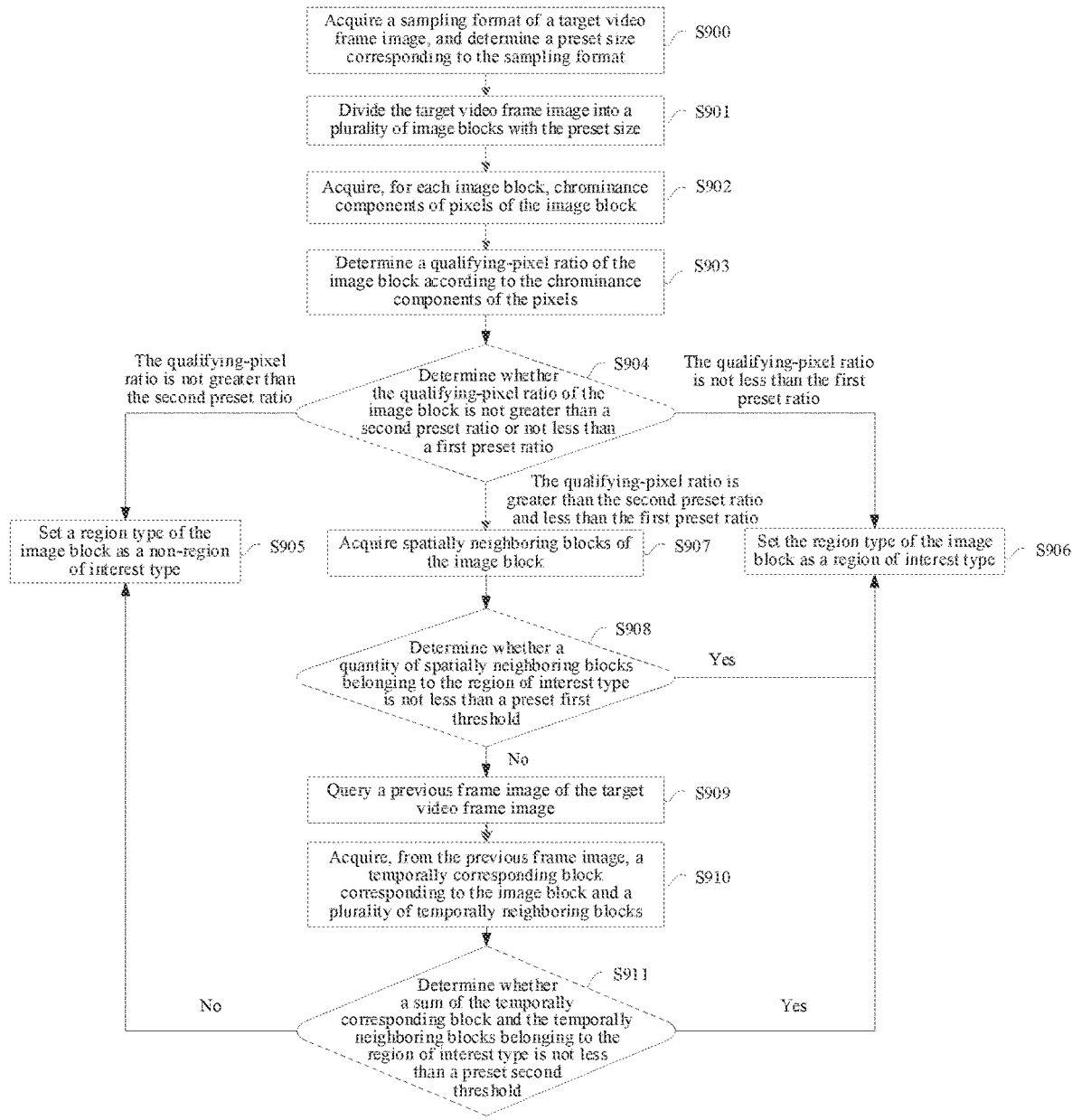
FIG. 9 is a schematic flowchart of a method for detecting a ROI according to an embodiment of the disclosure.

FIG. 9 is a schematic flowchart of a method for detecting a ROI according to an embodiment of the disclosure. As shown in FIG. 9, an example of a method for detecting a ROI of the disclosure in detail is described below. The method for detecting a ROI in an example embodiment of FIG. 9 may be performed by an electronic device, for example, the terminal 20 in FIG. 1 or a server, and may include the following operations S900-S911:

Operation S900: Acquire a sampling format of a target video frame image, and determine a preset size corresponding to the sampling format.

Operation S901: Divide the target video frame image into a plurality of image blocks with the preset size.

Operation S902: Acquire, for each image block, chrominance components of pixels of the image block.

Operation S903: Determine a qualifying-pixel ratio of the image block according to the chrominance components of the pixels.

Operation S904: Determine whether the qualifying-pixel ratio of the image block is not greater than a second preset ratio or not less than a first preset ratio; when the qualifying-pixel ratio is not greater than the second preset ratio, perform operation S905; when the qualifying-pixel ratio is not less than the first preset ratio, perform operation S906; and when the qualifying-pixel ratio is greater than the second preset ratio and less than the first preset ratio, perform operation S907.

Operation S905: Set a region type of the image block as a non-ROI type.

Operation S906: Set the region type of the image block as a ROI type.

Operation S907: Acquire spatially neighboring blocks of the image block.

Operation S908: Determine whether a quantity of spatially neighboring blocks belonging to the ROI type is not less than a preset first threshold; when the quantity is not less than the preset first threshold, perform operation S906; and when the quantity is less than the preset first threshold, perform operation S908.

Operation S909: Query a previous frame image of the target video frame image.

Operation S910: Acquire, from the previous frame image, a temporally corresponding block corresponding to the image block and a plurality of temporally neighboring blocks.

Operation S911: Determine whether a sum of the temporally corresponding block and the temporally neighboring blocks belonging to the ROT type is not less than a preset second threshold; when the sum is not less than the preset second threshold, perform operation S906; and when the sum is less than the preset second threshold, perform operation S905.

While it is described in the embodiment of FIG. 9 that the region type of the image block may be first determined according to the region types of the spatially neighboring blocks and then further determined according to the region types of the temporally neighboring blocks, it is merely an example. For example, the region type of the image block may be first determined according to the region type of the temporally neighboring blocks and then further determined according to the region types of the spatially neighboring blocks; or the region type of the image block may be determined according to the region types of the spatially neighboring blocks and not according to the region types of the temporally neighboring blocks; or the region type of the image block may be determined according to the region types of the temporally neighboring blocks and not according to the region types of the spatially neighboring blocks.

In the foregoing example, a target video frame image is divided into a plurality of image blocks with a preset size; for each image block, chrominance components of pixels of the each image block are acquired, and a qualifying-pixel ratio of the image block is determined according to the chrominance components of the pixels; region types of the image blocks are determined based on qualifying-pixel ratios of the image blocks; when the qualifying-pixel ratio is greater than the second preset ratio and less than the first preset ratio, the region type of the image block is further determined according to the region types of the spatially neighboring blocks and the temporally neighboring blocks; and the ROI map is generated according to the region types of the image blocks. This method has high detection efficiency and is less time-consuming, and therefore, may provide real-time ROI detection capability.

Figure 10:
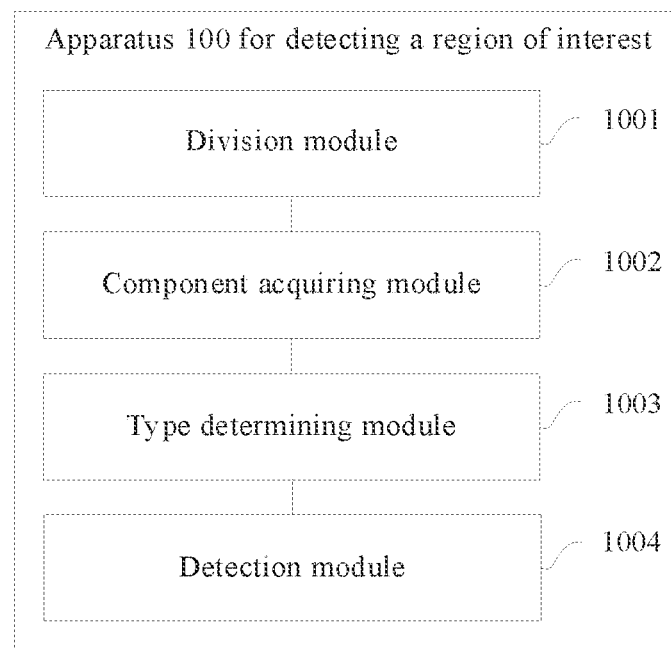
FIG. 10 is a schematic structural diagram of an apparatus for detecting a ROI according to an embodiment of the disclosure.

FIG. 10 is a schematic structural diagram of an apparatus for detecting a ROI according to an embodiment of the disclosure. In an example embodiment of the disclosure, as shown in FIG. 10, an apparatus 100 for detecting a ROI is provided. The apparatus 100 for detecting a ROI may include: a division module 1001, a component acquiring module 1002, a type determining module 1003, and a detection module 1004.

The division module 1001 is configured to acquire a target video frame image, and divide the target video frame image into a plurality of image blocks with a preset size.

The component acquiring module 1002 is configured to acquire, for each image block, chrominance components of pixels of the image block, and determine a qualifying-pixel ratio of the image block according to the chrominance components of the pixels, the qualifying-pixel ratio being a ratio of pixels meeting a preset chrominance condition to the pixels of the image block.

The type determining module 1003 is configured to determine region types of the image blocks based on qualifying-pixel ratios of the image blocks.

The detection module 1004 is configured to detect a ROI of the target video frame image according to the region types of the image blocks.

In the apparatus for detecting a ROI, a target video frame image is divided into a plurality of image blocks; then, chrominance components of pixels of each image block are acquired, and a qualifying-pixel ratio of the image block is determined according to the chrominance components of the pixels; then, region types of the image blocks are determined based on qualifying-pixel ratios of the image blocks; and further, a ROI map is generated according to the region types of the image blocks. This apparatus has high detection efficiency and is less time-consuming, and therefore, may provide real-time ROI detection capability.

In an example embodiment of the disclosure, the apparatus 100 for detecting a ROI may further include:

a size determining module, configured to acquire a sampling format of the target video frame image, and determine the preset size corresponding to the sampling format.

In an example embodiment of the disclosure, when determining region types of the image blocks based on qualifying-pixel ratios of the image blocks, the type determining module 1003 is further configured to:

set, for each image block in the image blocks, a region type of the image block to a ROI type when a qualifying-pixel ratio of the image block is not less than a first preset ratio.

In an example embodiment of the disclosure, when determining region types of the image blocks based on qualifying-pixel ratios of the image blocks, the type determining module 1003 is further configured to:

set, for each image block in the image blocks, a region type of the image block to a non-ROI type when a qualifying-pixel ratio of the image block is not greater than a second preset ratio.

In an example embodiment of the disclosure, when determining region types of the image blocks based on qualifying-pixel ratios of the image blocks, the type determining module 1003 is further configured to:

acquire, for each image block in the image blocks, a region type of at least one spatially neighboring block of the image block when a qualifying-pixel ratio of the image block is greater than a second preset ratio and less than a first preset ratio; and determine, according to the region type of the at least one spatially neighboring block, a quantity of spatially neighboring blocks belonging to a ROI type, and set the region type of the image block as the ROI type when the quantity of the spatially neighboring blocks belonging to the ROI type is not less than a preset first threshold.

In an example embodiment of the disclosure, the chrominance component includes a U component and a V component; and the preset chrominance condition is that, for example, the U component is not less than 100 and not greater than 127, and the V component is not less than 135 and not greater than 155.

In an example embodiment of the disclosure, when determining region types of the image blocks based on qualifying-pixel ratios of the image blocks, the type determining module 1003 is further configured to:

query, for each image block in the image blocks, one or more previous frame images of the target video frame image when a qualifying-pixel ratio of the image block is greater than a second preset ratio and less than a first preset ratio;

acquire, from the one or more previous frame images, a temporally corresponding block corresponding to the image block, and acquire a plurality of temporally neighboring blocks adjacent to the temporally corresponding block; and set a region type of the image block as a ROI type when a sum of the temporally corresponding block and the temporally neighboring blocks belonging to the ROI type is not less than a preset second threshold.

In an example embodiment of the disclosure, when acquiring a temporally corresponding block corresponding to the image block from one or more previous frame images, the type determining module 1003 is further configured to:

determine, for each image block in the image blocks, a coordinate position of the image block in the target video frame image; and set an image block having the coordinate position in the one or more previous frame images as the temporally corresponding block.

In an example embodiment of the disclosure, when acquiring a temporally corresponding block corresponding to the image block from one or more previous frame images, the type determining module 1003 is further configured to:

determine, for each image block in the image blocks, a coordinate position of the image block in the target video frame image; and acquire motion information between the one or more previous frame images and the target video frame image, adjust the coordinate position according to the motion information, and acquire, from the one or more previous frame images, the temporally corresponding block according to the adjusted coordinate position.

In an example embodiment of the disclosure, the detection module 1004 is further configured to:

mark image blocks belonging to the ROI type in the image blocks of the target video frame image, to obtain a ROI map; and detect the ROI of the target video frame image according to the ROI map.

In an example embodiment of the disclosure, the detection module 1004 is further configured to:

mark image blocks belonging to the ROI type in the image blocks of the target video frame image, to obtain an initial region map;

corrode the initial region map based on a preset corrosion template, to obtain a corrosion map;

expand the corrosion map based on a preset expansion template, to obtain a ROI map; and detect the ROI of the target video frame image according to the ROI map.

In an example embodiment of the disclosure, the expansion template is an asymmetric template, and a position of a central point in the asymmetric template is set based on a preset sequence according to which the region types of the image blocks are determined.

The apparatus for detecting a ROI of an image of the embodiments of the disclosure may perform the method for detecting a ROI of an image according to example embodiments of the disclosure. Actions performed by modules in the apparatus for detecting a ROI of an image in the embodiments of the disclosure correspond to operations in the method for detecting a ROI of an image in the embodiments of the disclosure. For detailed functional descriptions of the modules of the apparatus for detecting a ROI of an image of the embodiments of the disclosure, reference may be specifically made descriptions of the foregoing corresponding method for detecting a ROI of an image, and details are not described herein again.

Based on the principle of the method shown in the embodiments of the disclosure, an embodiment of the disclosure further provides an electronic device. The electronic device may include, but is not limited to, a processor and a memory. The memory is configured to store computer operation instructions; and the processor is configured to invoke the computer operation instructions to implement the method for detecting a ROI shown in the embodiments. Compared with the conventional technology, the method for detecting a ROI shown in the disclosure has higher detection efficiency and is less time-consuming, and therefore, may provide real-time ROI detection capability.

An electronic device is provided in an example embodiment. An electronic device 4000 shown in FIG. 11 includes a processor 4001 and a memory 4003. The processor 4001 and the memory 4003 are connected, for example, are connected by a bus 4002. In an embodiment, the electronic device 4000 may further include a transceiver 4004. In an actual application, there may be one or more transceivers 4004. The structure of the electronic device 4000 does not constitute a limitation on this embodiment of the disclosure.

The processor 4001 may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content in the disclosure. The processor 4001 may alternatively be a combination to implement a computing function, for example, may be a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 9 is represented by using only one bold line, but it does not indicate that there is only one bus or one type of bus.

The memory 4003 may be a read-only memory (ROM) or a static storage device of another type that may store static information and instructions, a random access memory (RAM) or a dynamic storage device of another type that may store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that may be used to carry or store expected program code in a command or data structure form and that may be accessed by a computer, but is not limited thereto.

The memory 4003 is configured to store application program codes for performing the solutions of the disclosure, and is controlled and executed by the processor 4001. The processor 4001 is configured to execute application program code stored in the memory 4003 to implement content shown in the foregoing method embodiments.

Figure 11:
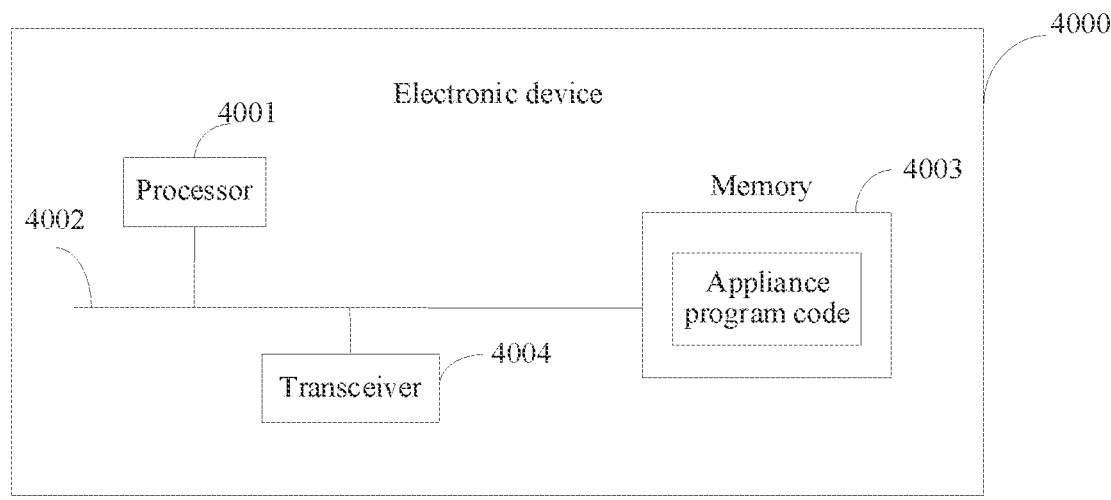
FIG. 11 is a schematic structural diagram of an electronic device according to an embodiment of the disclosure.

The electronic device includes, but is not limited to, a mobile terminal such as a mobile phone, a notebook computer, a digital broadcast receiver, a personal digital assistant (PDA), a tablet computer (Pad), a portable multimedia player (PMP), or an in-vehicle terminal (such as, an in-vehicle navigation terminal), and a fixed terminal such as a digital television (TV) or a desktop computer. The electronic device shown in FIG. 11 is merely an example, and is not to impose any limitation on a function and use scope of the embodiments of the disclosure.

An embodiment of the disclosure provides a computer-readable storage medium. The computer-readable storage medium is configured to store a computer program, the computer program, when run on a computer, causing the computer to implement corresponding content in the foregoing method embodiments. Compared with the conventional technology, the method for detecting a ROI shown in the disclosure has higher detection efficiency and is less time-consuming, and therefore, may provide real-time ROI detection capability.

It is to be understood that, although the operations in the flowchart in the accompanying drawings are sequentially shown according to indication of an arrow, the operations are not necessarily sequentially performed according to a sequence indicated by the arrow. Unless explicitly specified in this specification, execution of the operations is not strictly limited in the sequence, and the operations may be performed in other sequences. In addition, at least some operations in the flowcharts in the accompanying drawings may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

It is to be understood that, the computer readable medium shown in the disclosure may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to, wireless transmission, a cable, radio frequency (RF) or the like, or any other suitable combination thereof.

The foregoing computer-readable medium may be included in the foregoing electronic device, or may exist alone and is not disposed in the electronic device.

The computer-readable medium carries one or more programs, the one or more programs, when executed by the electronic device, causing the electronic device to implement the method shown in the foregoing embodiments.

One or more programming languages or any combination thereof may be used to write the computer program code used for performing the operations in the disclosure. The programming languages include, but are not limited to an object oriented programming language such as Java, Smalltalk, C++, or the like and a conventional procedural programming language, such as the C programming language or a similar programming language. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a local area network (LAN) or a wide area network (WAN), or may be connected to an external computer (for example, through the Internet by using an Internet service provider).

The flowcharts and block diagrams in the accompanying drawings illustrate possible system architectures, functions, and operations that may be implemented by a system, a method, and a computer program product according to various embodiments of the disclosure. In this regard, each block in the flowchart or the block diagram may represent a module, a program segment, or a part of code. The module, the program segment, or the part of the code includes one or more executable instructions for implementing a specified logical function. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. It is also to be understood that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

The modules described in the embodiments of the disclosure may be implemented in software and/or hardware. Names of the modules do not constitute limitations on the modules in some cases. For example, the detection module may alternatively be described as "a module configured to detect a ROI of a target video frame image".

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure and descriptions of the technical principles used. A person skilled in the art shall understand that the scope of the disclosure is not limited to the technical solutions that are provided by the foregoing particular combinations of technical features, but shall also encompass other technical solutions formed by variously combining the foregoing technical features or equivalent features thereof without departing from the foregoing described concept. For example, technical solutions formed by replacing the foregoing features with technical features having similar functions in the disclosure (but not limited thereto) are also included. Thus, it will be understood that various changes in form and details may be made therein without departing from the spirit and scope of the following claims and their equivalents.

What is claimed is:

1. A method for detecting a region of interest (ROI), performed by an electronic device, the method comprising:
    dividing a target video frame image into a plurality of image blocks arranged in rows and columns, each of the plurality of image blocks having a preset size;
    acquiring, for each image block, chrominance components of pixels of an image block, and determining a pixel ratio
    of the image block according to the chrominance components of the pixels, the pixel ratio being a ratio of pixels meeting a preset chrominance condition to the pixels of the image block;
    determining region types of the plurality of image blocks based on pixel ratios of the plurality of image blocks, wherein the determining the region types is performed according to a preset sequence, the preset sequence indicating an order in which the region types of the plurality of image blocks are to be determined along the rows and the columns; and
    detecting a ROI of the target video frame image according to the region types of the plurality of image blocks,
    wherein the detecting the ROI of the target video frame image comprises:
    marking image blocks belonging to a ROI type in the plurality of image blocks of the target video frame image, to obtain an initial region map;
    corroding the initial region map based on a preset corrosion template, to obtain a corrosion map;
    expanding the corrosion map based on a preset expansion template, to obtain a ROI map; and
    detecting the ROI of the target video frame image according to the ROI map, and
    wherein the expansion template is an asymmetric template to restore some image blocks among the plurality of image blocks, and a position of a central point of the asymmetric template corresponds to a position of a later order in the preset sequence.

2. The method for detecting a ROI according to claim 1, further comprising, prior to the dividing the target video frame image:
    acquiring a sampling format of the target video frame image, and determining the preset size corresponding to the sampling format.

3. The method for detecting a ROI according to claim 1, wherein the determining the region types comprises:
    setting, for each image block in the plurality of image blocks, a region type of the image block to a ROI type based on the pixel ratio of the image block being not less than a first preset ratio.

4. The method for detecting a ROI according to claim 1, wherein the determining the region types comprises:
    setting, for each image block in the plurality of image blocks, a region type of the image block to a non-ROI type based on the pixel ratio of the image block being not greater than a second preset ratio.

5. The method for detecting a ROI according to claim 1, wherein the determining the region types comprises:
    acquiring, for each image block in the plurality of image blocks, a region type of at least one spatially neighboring block of the image block based on the pixel ratio of the image block being less than a first preset ratio and greater than a second preset ratio; and
    determining, according to the region type of the at least one spatially neighboring block, a quantity of spatially neighboring blocks belonging to a ROI type, and setting the region type of the image block as the ROI type based on the quantity of the spatially neighboring blocks belonging to the ROI type being not less than a preset first threshold.

6. The method for detecting a ROI according to claim 1, wherein a chrominance component of a pixel comprises a U component and a V component; and the preset chrominance condition is that the U component is not less than 100 and not greater than 127, and the V component is not less than 135 and not greater than 155.

7. The method for detecting a ROI according to claim 1, wherein the determining the region types comprises:
    querying, for each image block in the plurality of image blocks, one or more previous frame images of the target video frame image based on the pixel ratio of the image block being less than a first preset ratio and greater than a second preset ratio;
    acquiring, from the one or more previous frame images, a temporally corresponding block corresponding to the image block, and acquiring a plurality of temporally neighboring blocks adjacent to the temporally corresponding block; and
    setting a region type of the image block as a ROI type based on a sum of the temporally corresponding block and the plurality of temporally neighboring blocks belonging to the ROI type being not less than a preset second threshold.

8. The method for detecting a ROI according to claim 7, wherein the acquiring the temporally corresponding block comprises:
    determining, for each image block in the plurality of image blocks, a coordinate position of the image block in the target video frame image; and
    setting an image block having the coordinate position in the one or more previous frame images as the temporally corresponding block.

9. The method for detecting a ROI according to claim 7, wherein the acquiring the temporally corresponding block comprises:
    determining, for each image block in the plurality of image blocks, a coordinate position of the image block in the target video frame image; and
    acquiring motion information between the one or more previous frame images and the target video frame image, adjusting the coordinate position according to the motion information, and acquiring, from the one or more previous frame images, the temporally corresponding block according to the adjusted coordinate position.

10. The method for detecting a ROI according to claim 1, wherein the detecting the ROI of the target video frame image comprises:
marking image blocks belonging to a ROI type in the plurality of image blocks of the target video frame image, to obtain a ROI map; and
detecting the ROI of the target video frame image according to the ROI map.

11. An electronic device, comprising a memory, a processor, and a computer program stored on the memory and executable by the processor to perform the method according to claim 1.

12. An apparatus for detecting a region of interest (ROI), comprising:
at least one memory configured to store program code; and
at least one processor configured to read the program code and operate as instructed by the program code, the program code comprising:
division code configured to cause the at least one processor to divide a target video frame image into a plurality of image blocks arranged in rows and columns, each of the plurality of image blocks having a preset size;
component acquiring code configured to cause the at least one processor to acquire, for each image block, chrominance components of pixels of an image block, and determine a pixel ratio of the image block according to the chrominance components of the pixels, the pixel ratio being a ratio of pixels meeting a preset chrominance condition to the pixels of the image block;
type determining code configured to cause the at least one processor to determine region types of the plurality of image blocks based on pixel ratios of the plurality of image blocks, wherein determining the region types is performed according to a preset sequence, the preset sequence indicating an order in which the region types of the plurality of image blocks are to be determined along the rows and the columns; and
detection code configured to cause the at least one processor to detect a ROI of the target video frame image according to the region types of the plurality of image blocks,
wherein the detection code is configured to cause the at least one processor to mark image blocks belonging to a ROI type in the plurality of image blocks of the target video frame image, to obtain an initial region map; corrode the initial region map based on a preset corrosion template, to obtain a corrosion map; expand the corrosion map based on a preset expansion template, to obtain a ROI map; and detect the ROI of the target video frame image according to the ROI map, and
wherein the expansion template is an asymmetric template to restore some image blocks among the plurality of image blocks, and a position of a central point of the asymmetric template corresponds to a position of a later order in the preset sequence.

13. The apparatus for detecting a ROI according to claim 12, wherein the type determining code is configured to cause the at least one processor to acquire, for each image block in the plurality of image blocks, a region type of at least one spatially neighboring block of the image block based on the pixel ratio of the image block being less than a first preset ratio and greater than a second preset ratio; and determine, according to the region type of the at least one spatially neighboring block, a quantity of spatially neighboring blocks belonging to a ROI type, and set the region type of the image block as the ROI type based on the quantity of the spatially neighboring blocks belonging to the ROI type being not less than a preset first threshold.

14. The apparatus for detecting a ROI according to claim 12, wherein the type determining code is configured to cause the at least one processor to query, for each image block in the plurality of image blocks, one or more previous frame images of the target video frame image based on the pixel ratio of the image block being less than a first preset ratio and greater than a second preset ratio; acquire, from the one or more previous frame images, a temporally corresponding block corresponding to the image block, and acquire a plurality of temporally neighboring blocks adjacent to the temporally corresponding block; and set a region type of the image block as a ROI type based on a sum of the temporally corresponding block and the plurality of temporally neighboring blocks belonging to the ROI type being not less than a preset second threshold.

15. The apparatus for detecting a ROI according to claim 14, wherein the type determining code is configured to cause the at least one processor to determine, for each image block in the plurality of image blocks, a coordinate position of the image block in the target video frame image; and acquire motion information between the one or more previous frame images and the target video frame image, adjust the coordinate position according to the motion information, and acquire, from the one or more previous frame images, the temporally corresponding block according to the adjusted coordinate position.

16. A non-transitory computer-readable storage medium, storing a computer program that is executable by at least one processor to perform a method for detecting a region of interest (ROI), the method comprising:
dividing a target video frame image into a plurality of image blocks arranged in rows and columns, each of the plurality of image blocks having a preset size;
acquiring, for each image block, chrominance components of pixels of an image block, and determining a pixel ratio of the image block according to the chrominance components of the pixels, the pixel ratio being a ratio of pixels meeting a preset chrominance condition to the pixels of the image block;
determining region types of the plurality of image blocks based on pixel ratios of the plurality of image blocks, wherein the determining the region types is performed according to a preset sequence, the preset sequence indicating an order in which the region types of the plurality of image blocks are to be determined along the rows and the columns; and
detecting a ROI of the target video frame image according to the region types of the plurality of image blocks,
wherein the detecting the ROI of the target video frame image comprises:
marking image blocks belonging to a ROI type in the plurality of image blocks of the target video frame image, to obtain an initial region map;
corroding the initial region map based on a preset corrosion template, to obtain a corrosion map;
expanding the corrosion map based on a preset expansion template, to obtain a ROI map; and
detecting the ROI of the target video frame image according to the ROI map, and
wherein the expansion template is an asymmetric template to restore some image blocks among the plurality of image blocks, and a position of a central point of the asymmetric template corresponds to a position of a later order in the preset sequence.

* * * * *